United States Patent [19]
Torii et al.

[11] Patent Number: 5,204,598
[45] Date of Patent: Apr. 20, 1993

[54] METHOD AND APPARATUS FOR STOPPING AN INDUSTRIAL ROBOT

[75] Inventors: Nobutoshi Torii, Hachioji; Susumu Ito, Yamanashi; Masayuki Hamura, Yamanashi; Tamotsu Sakai, Yamanashi, all of Japan

[73] Assignee: Fanuc Ltd., Minamitsuru, Japan

[21] Appl. No.: 773,593

[22] PCT Filed: Mar. 13, 1991

[86] PCT No.: PCT/JP91/00353

§ 371 Date: Nov. 21, 1991

§ 102(e) Date: Nov. 21, 1991

[87] PCT Pub. No.: WO91/14544

PCT Pub. Date: Oct. 3, 1991

[30] Foreign Application Priority Data

Mar. 29, 1990 [JP] Japan .................................. 2-81694

[51] Int. Cl.$^5$ .............................................. B25J 19/06
[52] U.S. Cl. .................................. 318/568.1; 318/565; 318/563; 364/474.2; 901/9
[58] Field of Search .................. 318/560–600, 318/632, 648, 603; 364/474.01–474.32; 395/88–99; 901/3, 6, 9, 12, 15, 18–23; 388/811

[56] References Cited

U.S. PATENT DOCUMENTS

| | | | |
|---|---|---|---|
| 3,868,557 | 2/1975 | Scott, Jr. | 318/685 |
| 4,039,919 | 8/1977 | Suzaki et al. | 318/696 |
| 4,066,935 | 1/1978 | Takaoka et al. | 318/254 X |
| 4,225,811 | 9/1980 | Kuhnlein et al. | 318/261 |
| 4,229,684 | 10/1980 | Saglini et al. | 318/561 |
| 4,386,298 | 5/1983 | Toshimitu | 318/254 |
| 4,406,981 | 9/1983 | Watanabe et al. | 318/258 |
| 4,549,120 | 10/1985 | Banno et al. | 318/254 |
| 4,629,949 | 12/1986 | Senso | 318/257 |
| 4,650,375 | 3/1987 | Millsap | 318/285 X |
| 4,672,281 | 6/1987 | Yagusic et al. | 318/592 |
| 4,682,089 | 7/1987 | Tamari | 318/563 X |
| 4,687,982 | 8/1987 | Palaniappan | 318/763 |
| 4,745,347 | 5/1988 | Wrege et al. | 318/744 |
| 4,779,260 | 10/1988 | Kaneko et al. | 318/373 X |
| 4,888,537 | 12/1989 | Appel et al. | 318/626 |
| 4,888,707 | 12/1989 | Shimada | 364/474.2 |
| 4,893,254 | 1/1990 | Chan et al. | 901/9 X |
| 4,922,430 | 5/1990 | Wavish | 364/461 |
| 4,928,044 | 5/1990 | Shiba | 318/364 |
| 4,933,611 | 6/1990 | Albanesius et al. | 318/285 |
| 4,959,598 | 9/1990 | Yoshida et al. | 318/599 |
| 5,047,703 | 9/1991 | Akamatsu | 318/603 |
| 5,055,754 | 10/1991 | Kishi et al. | 318/565 |
| 5,056,031 | 10/1991 | Nakano et al. | 364/474.2 X |
| 5,070,285 | 12/1991 | Yamane et al. | 388/811 X |
| 5,079,713 | 1/1992 | Kawamura et al. | 364/474.2 |

*Primary Examiner*—Paul Ip
*Attorney, Agent, or Firm*—Staas & Halsey

[57] ABSTRACT

An industrial robot having a plurality of axes drivable by respective servomotors is stopped in operation after detecting a collision of the industrial robot with foreign matter. The monitoring of a position error of a servomotor for the axis with respect to which the collision is detected is stopped (S11), and the speed command for that axis is set to "0" (S12). A reverse torque is generated (S13) to decelerate and stop the servomotor. After elapse of a predetermined period of time (S14), the monitoring of a position error is resumed (S15). If the position error exceeds a predetermined value (S31), then an alarm is activated (S32). Then, currents supplied to all the servomotors are cut off (S33), thus stopping the operation of the robot in a short period of time.

5 Claims, 4 Drawing Sheets

METHOD AND APPARATUS FOR STOPPING AN INDUSTRIAL ROBOT

BACKGROUND OF THE INVENTION

1. Field of the Invention

The present invention relates to a method of stopping an industrial robot after the industrial robot collides with an object, and more particularly to a method of stopping an industrial robot for increased safety.

2. Description of the Related Art

When an industrial robot (hereinafter referred to as a "robot") collides with foreign matter due to a teaching process error or the like, it is necessary to stop the operation of the robot for the safety of the operator and the protection of the robot. It is customary to apply a speed command of nil to the servomotor associated with each axis with respect to which the collision has been detected, thereby producing a reverse torque to stop the operation of the robot in as short a period of time as possible. For an axis with respect to which no collision is detected, an alarm is issued after a position deviation or error, which is the difference between a position command for the servomotor and an actual position thereof, takes a value greater than a predetermined value, thus cutting off the drive current supplied to the servomotor.

According to the above conventional process, since a collision is detected with respect to each axis, and a reverse torque is applied to any axis with respect to which a collision is detected, the operation of the axis is stopped in a short period of time. For an axis with respect to which no collision is detected, however, its operation based on a motion command is continued until the position command for the axis exceeds a predetermined value and an alarm is issued. Therefore, the robot moves along a path different from a taught path, resulting in a safety failure. Inasmuch as the de-energization of the servomotor for the axis with respect to which no collision is detected is delayed, the complete stoppage of the robot is also delayed.

SUMMARY OF THE INVENTION

In view of the aforesaid drawbacks of the conventional industrial robots, it an object of the present invention to provide a method of stopping an industrial robot within a short period of time for an axis with respect to which no collision is detected.

To accomplish the above object, there is provided in accordance with the present invention a method of stopping an industrial robot having a plurality of axes drivable by respective servomotors after a collision of the industrial robot with foreign matter is detected, the method comprising the steps of, after the collision is detected, setting a speed command for the servomotor for the axis with respect to which the collision is detected, to "0", thereby producing a reverse torque to stop rotation of the servomotor, calculating a position error as the difference between a position command applied to the servomotor and an actual position thereof after elapse of a predetermined period of time, activating an alarm if the position error of the servomotor exceeds a predetermined value, or if the position error of another servomotor exceeds the predetermined value, and cutting off currents supplied to all the servomotors for thereby stopping movement of the industrial robot.

According to the present invention, there is also provided a method of stopping an industrial robot after a collision of the industrial robot with foreign matter is detected, the method comprising the steps of, after the collision is detected, informing a host processor of the collision, setting a speed command for the servomotor for the axis with respect to which the collision is detected, to "0", thereby producing a reverse torque to stop rotation of the servomotor, cutting off a current supplied to the servomotor after elapse of a predetermined period of time, cutting off currents supplied to all the servomotors under the control of the host processor in response to the informed collision, for thereby stopping movement of the industrial robot.

The monitoring of a position error of a servomotor for the axis with respect to which the collision is detected is stopped, and a speed command is set to "0". A reverse torque is generated to decelerate and stop the servo-motor. After elapse of a predetermined period of time, the monitoring of a position error is resumed. If the position error exceeds a predetermined value, then an alarm is activated. For the axis with respect to which the collision is not detected, the monitoring of a position error is continued, and an alarm is activated if the position error exceeds the predetermined value. Currents supplied to all the servomotors are cut off with whichever alarm is activated first. Generally, an alarm is generated earlier for an axis with respect to which a collision occurs, but an alarm for another axis may be generated earlier depending on the nature of the collision.

When the collision is detected for an axis, a current supplied to the servomotor for that axis is cut off after elapse of a predetermined period of time, and the host processor is informed of the collision. The host processor produces a command to cut off currents supplied to other servomotors. The currents supplied to all the servomotors are thus cut off, stopping operation of the robot.

DESCRIPTION OF THE PREFERRED EMBODIMENTS

An embodiment of the present invention will hereinafter be described with reference to the drawings.

Figure 3:
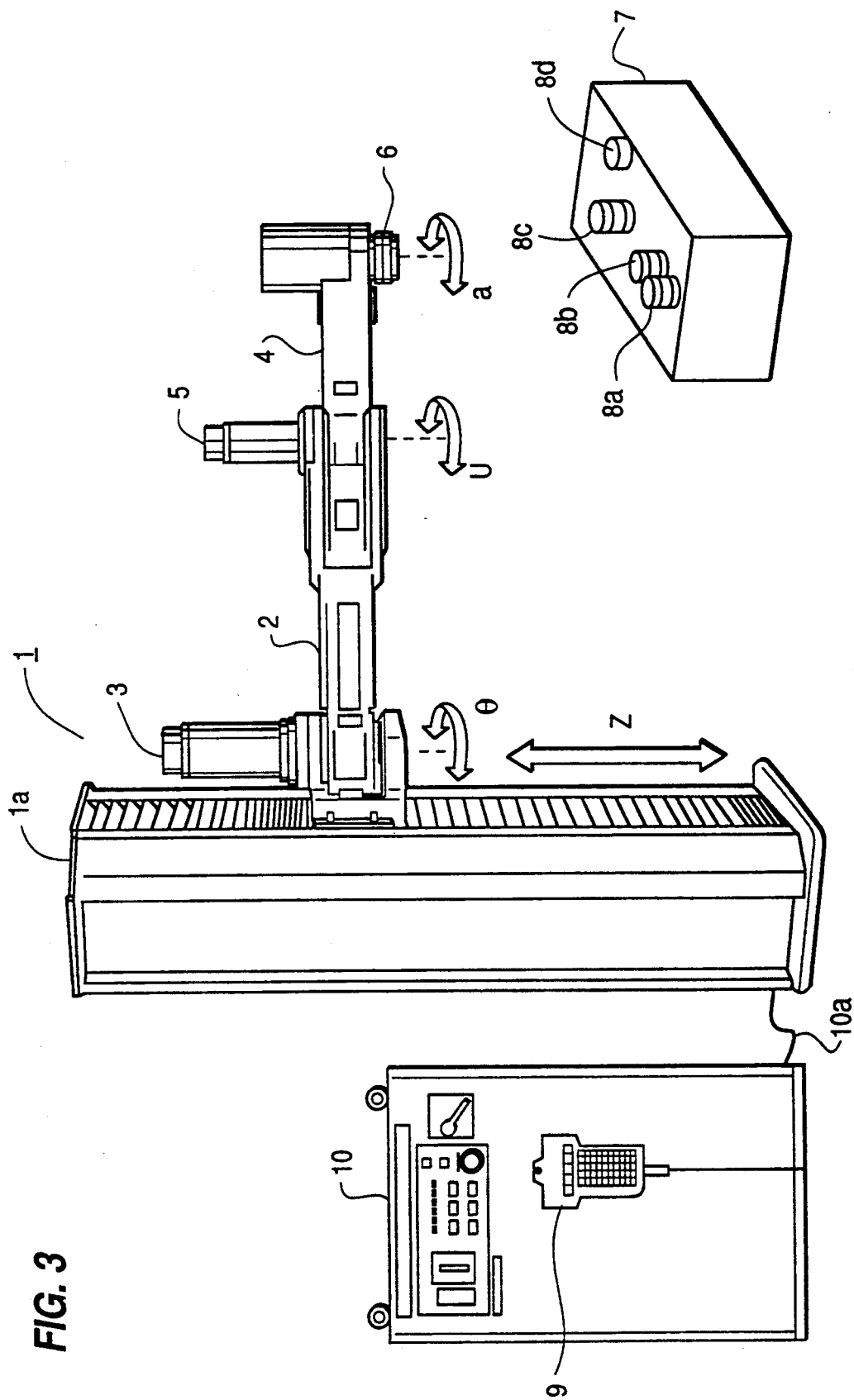
FIG. 3 is a perspective view of a horizontally articulated robot for a high-speed palletizing process.

FIG. 3 shows a horizontally articulated robot for a high-speed palletizing process. The horizontally articulated robot, generally denoted at 1, includes a robot base 1a having an Z-axis servomotor and a mechanism for vertically moving an arm 2 and components coupled thereto. The arm 2 can be rotated about a q-axis by a servomotor 3. An arm 4 rotatably coupled to the arm 2 can be rotated about a U-axis by a servomotor 5. The arm 4 supports on its distal end a wrist 6 that can be rotated about an a-axis. A hand attached to the wrist 6 for effecting a palletizing process is omitted from illustration. The robot 1 serves to palletize workpieces 8a, 8b, 8c, 8d on a table 7. The robot 1 is electrically connected to a robot control system 10 by a cable 10a, and a teach control panel 9 is electrically connected to the robot control system 10.

Figure 4:
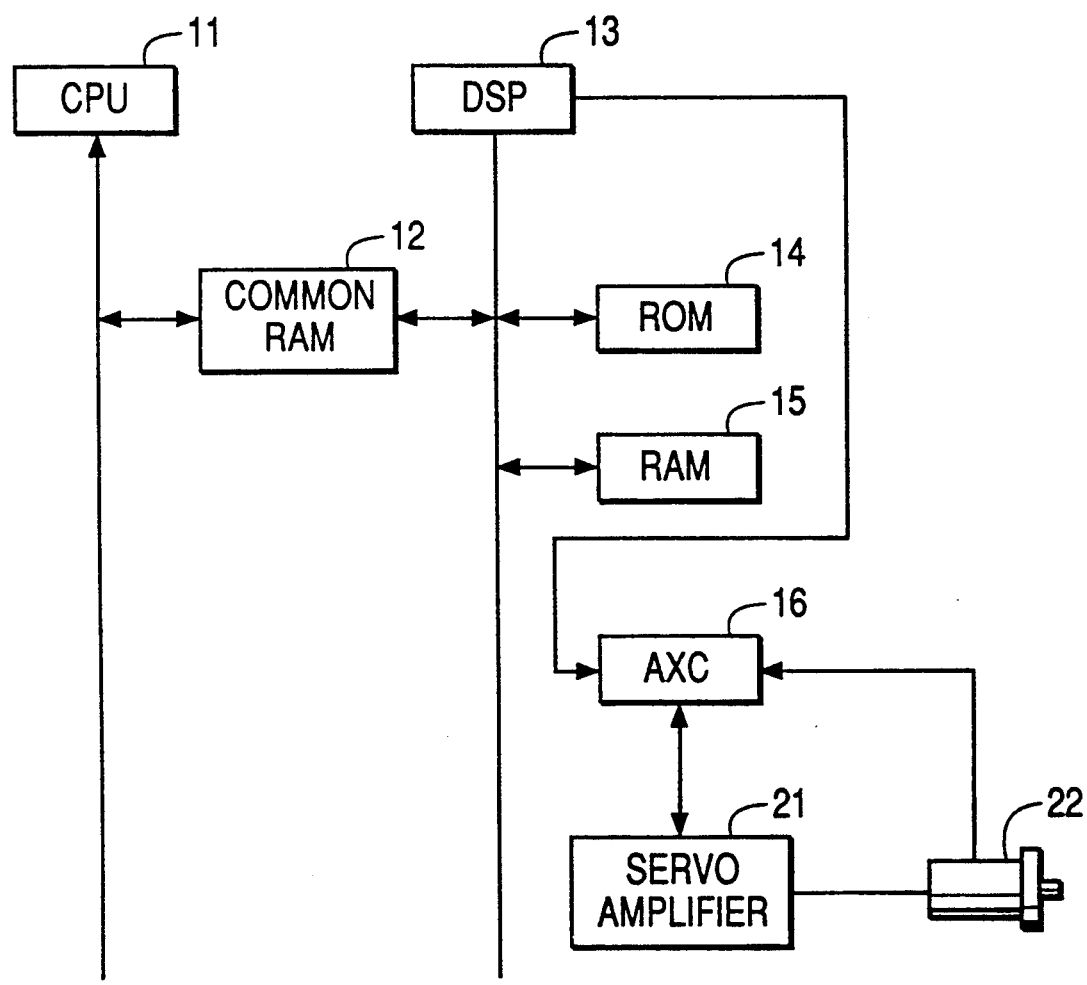
FIG. 4 is a block diagram of a hardware arrangement of a robot control system to which the present invention is applicable.

FIG. 4 shows in block form the robot control system 10. The robot control system 10 includes a host processor 11 for controlling the robot control system 10 in its entirety. The host processor 11 writes robot position commands into a common RAM 12. A ROM, a RAM, and other devices connected to the host processor 11 are omitted from illustration in FIG. 4.

A DSP (Digital Signal Processor) 13 operates according to a system program stored in a ROM 14, to read a position command from the common RAM 12 at predetermined time intervals, and applies the position command to an axis control circuit (AXC) 16. Necessary calculations or the like are carried out using a RAM 15.

The AXC 16 calculates a speed command from a position error or deviation according to the difference between the position command and a position fed back from a pulse coder (not shown) in a servomotor 22. The AXC 16 also differentiates the position fed back from the pulse coder into a speed, and calculates a current command from the difference between the calculated speed and the speed command. The AXC 16 applies the calculated current command to a servoamplifier 21 to energize the servomotor 22.

The DSP 13 detects a collision based on a change in the speed and the current of the servomotor 22, and cuts off the current supplied to the servomotor 22.

Since the servomotors of the industrial robots are controlled by identical control systems, only the control system for one axis is illustrated in FIG. 4.

The detection of a collision will be described below. According to a first process of detecting a collision, a collision is detected based on a change in the speed of the servomotor 22. Specifically, the change in the speed of the servomotor 22 in the event of a collision is larger than a speed change caused by normal acceleration or deceleration. The collision is detected based on this change in the speed. The specific value of the change in the speed varies depending on the servomotor or the load on the servomotor.

According to a second process of detecting a collision, a collision is detected based on a load current of the servomotor 22. In the event of a collision, the load on the servomotor 22 increases, and the load current of the servoamplifier 21 abruptly increases. When the load current exceeds a certain value, the condition is detected as a collision. When the servomotor 22 is accelerated or decelerated, since the load current is also increased by a load inertia, the load current due to the load inertia is deducted from the overall load current for determining a collision.

Figure 1:
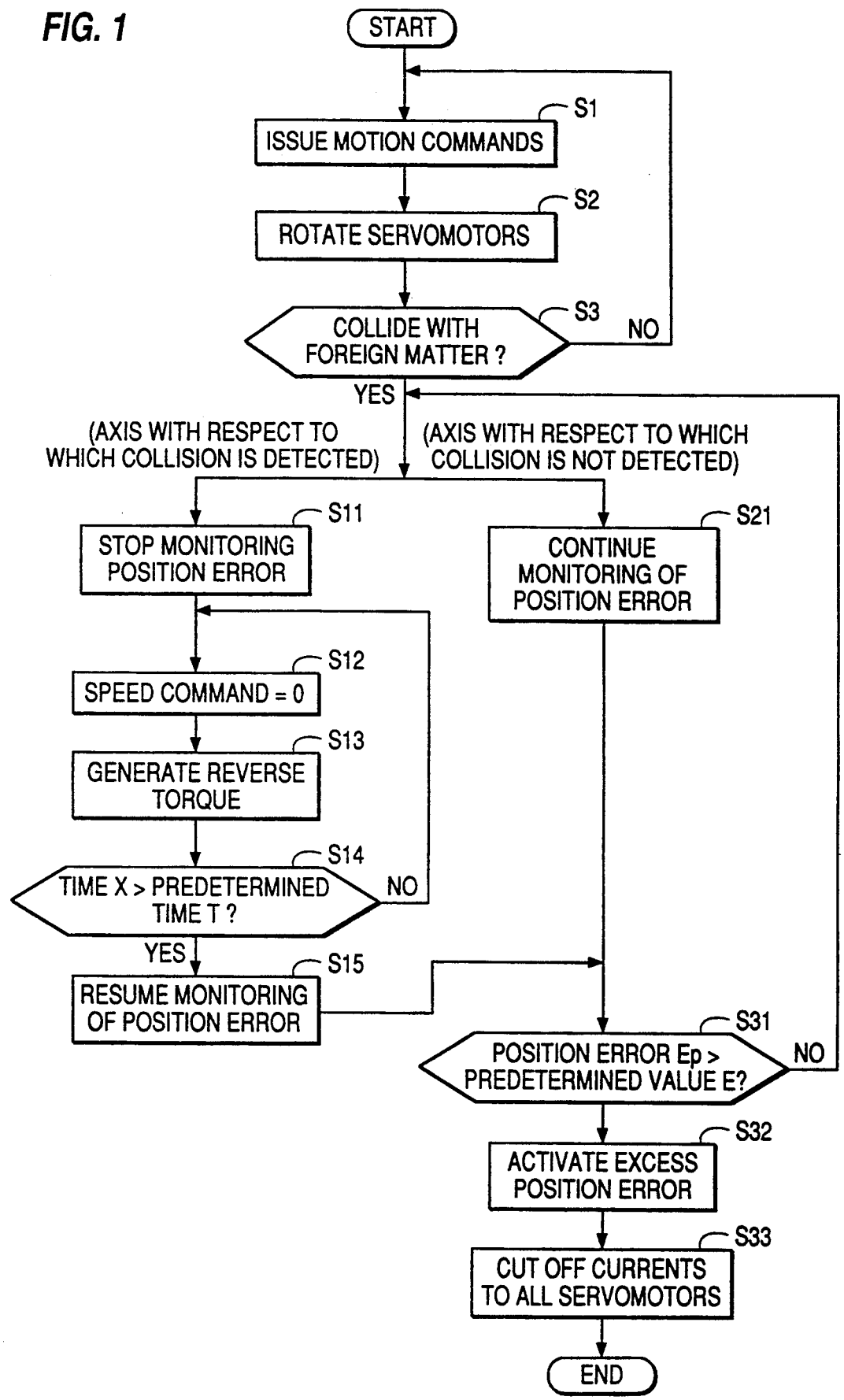
FIG. 1 is a flowchart of the processing sequence of a method of stopping an industrial robot according to an embodiment of the present invention.

FIG. 1 is a flowchart of the processing sequence of a method of stopping the industrial robot 1 according to an embodiment of the present invention. Numerals following the letter "S" in FIG. 1 represent step numbers. The processing sequence is executed by the DSP 13 shown in FIG. 4.

[S1] Motion commands are issued to the respective servomotors.

[S2] The servomotors are rotated to operate the robot 1.

[S3] If a collision with foreign matter is detected, then control goes to a step S11 for an axis with respect to which the collision is detected, and to a step S21 for an axis with respect to which the collision is not detected. If no collision is detected in the step S3, then control goes back to the step S1 to repeat the sequence therefrom.

[S11] For the axis with respect to which the collision is detected, the monitoring of a position error or deviation is stopped. If the monitoring of a position error were continued, a position error alarm would be activated, and it would not be able to stop the servomotor with a reverse torque in a short period of time.

[S12] The speed command applied to the servomotor is set to "0".

[S13] A reverse torque is generated to stop the servomotor in a short period of time.

[S14] This step determines whether a time X counted by a timer exceeds a predetermined time T. If the time X exceeds the time T, then control proceeds to a step S15, and if the time X does not exceed the time T, then control goes back to the step S12.

[S15] The monitoring of a position error is resumed. Since the motion command is continuously applied to the servomotor, the position error is abruptly increased with the speed command being set to "0" to apply a reverse torque to the servomotor.

[S21] For the axis with respect to which the collision is not detected, the monitoring of a position error is continued.

[S31] This step determines whether the position error Ep exceeds a predetermined value E for both the axis with respect to which the collision is detected and the axis with respect to which the collision is not detected. If the position error Ep exceeds the predetermined value E, then control goes to a step S32. If the position error Ep does not exceed the predetermined value E, then control goes back to the step S11 for the axis with respect to which the collision is detected, and to the step S21 for the axis with respect to which the collision is not detected.

[S32] Since the position error Ep exceeds the predetermined value E, an excess position error alarm is activated. Generally, an excess position error alarm is generated for an axis with respect to which a collision is detected. However, depending on the magnitude of a collision, an excess position error alarm may be generated first for an axis with respect to which a collision is not detected. At any rate, the same processing will follow for any axes regardless of whether a collision is detected or not with respect thereto.

[S33] The currents supplied to the servomotors associated with all the axes are cut off by turning off power supply switches of the servoamplifiers. All the servomotors are now de-energized, stopping the operation of the robot.

Figure 2:
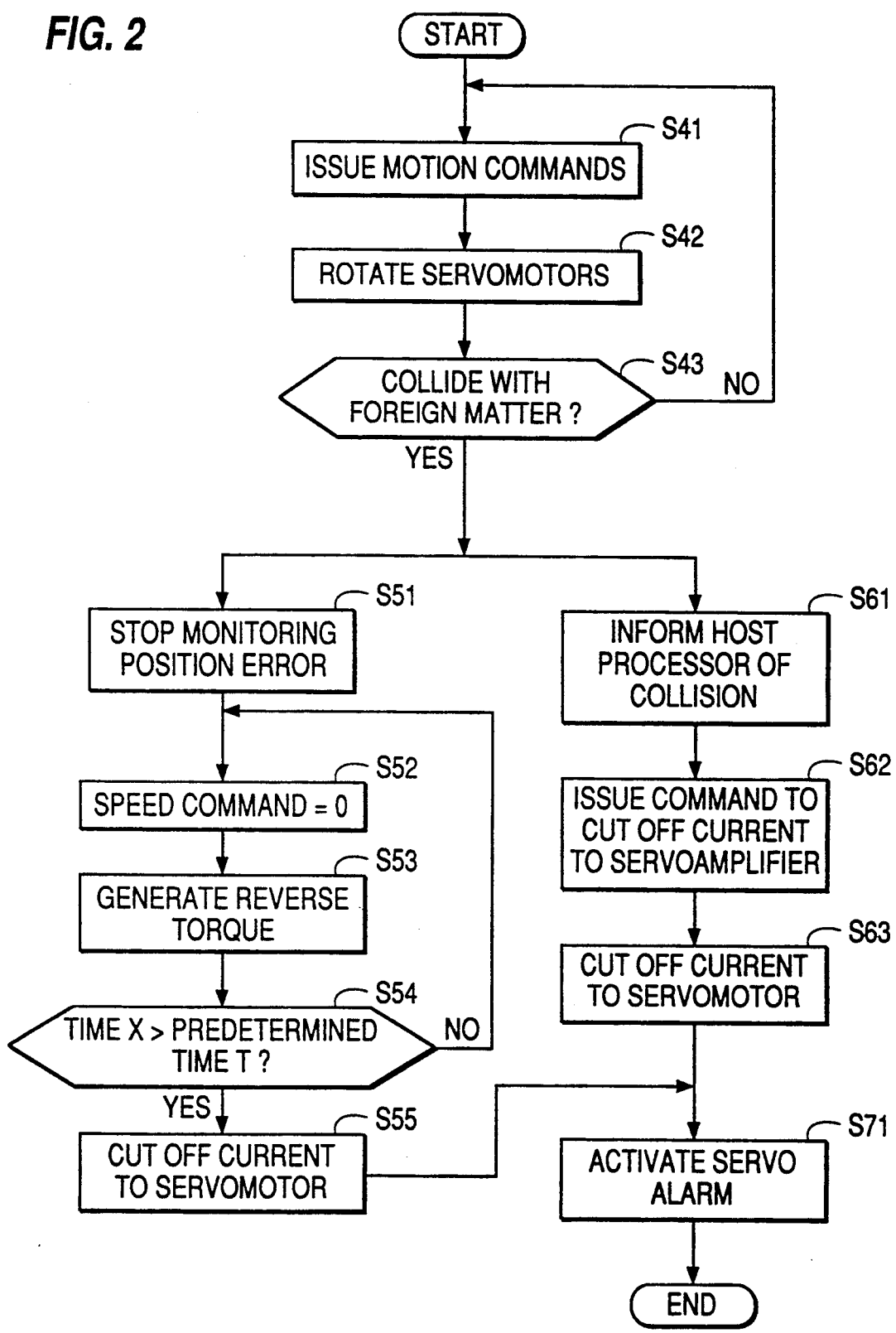
FIG. 2 is a flowchart of the processing sequence of a method of stopping an industrial robot according to another embodiment of the present invention.

FIG. 2 is a flowchart of the processing sequence of a method of stopping the industrial robot 1 according to another embodiment of the present invention.

[S41] Motion commands are issued to the respective servomotors.

[S42] The servomotors are rotated to operate the robot 1.

[S43] If a collision with foreign matter is detected, then control goes to a step S51 for an axis with respect to which the collision is detected.

[S51] For the axis with respect to which the collision is detected, the monitoring of a position error or deviation is stopped. If the monitoring of a position error were continued, a position error alarm would be activated, and it would not be able to stop the servomotor with a reverse torque in a short period of time.

[S52] The speed command applied to the servomotor is set to "0".

[S53] A reverse torque is generated to stop the servomotor in a short period of time.

[S54] This step determines whether a time X counted by a timer exceeds a predetermined time T. If the time X exceeds the time T, then control proceeds to a step S55, and if the time X does not exceed the time T, then control goes back to the step S52.

[S55] The current supplied to the servomotor for the axis with respect to which the collision is detected is cut off, i.e., the power supply switch of the servoamplifier is turned off, and control proceeds to a step S71.

[S61] A host processor is informed of the detection of the collision substantially simultaneously with step (S51).

[S62] The host processor instructs the servoamplifiers through the respective DSPs to cut off the currents for the axes with respect to which the collision is not detected.

[S63] The power supply switches of the servomotors are turned off.

[S71] The power supply switches of all the servoamplifiers are turned off, and a servo alarm is activated and displayed on a display unit.

While the process of stopping the palletizing robot after it has collided with foreign matter has been described above, the present invention is also applicable to other robots such as welding robots and assembling robots.

With the present invention, as described above, a reverse torque is applied to an axis with respect to which a collision is detected, and after a predetermined period of time has elapsed, an excess position error is detected for de-energizing all servomotors. Therefore, all the servomotors can be de-energized in a short period of time after the collision.

Since the axis with respect to which the collision is detected is stopped after the predetermined period of time, and the other axes are also stopped through the host processor, all the servomotors can be de-energized in a short period of time after the collision.

What is claimed is:

1. A method of stopping an industrial robot having a plurality of axes drivable by respective servomotors after a collision of the industrial robot with foreign matter is detected, said method comprising the steps of:

after the collision is detected, setting a speed command for a servomotor for an axis with respect to which the collision is detected, to "0", to produce a reverse torque to stop rotation of said servomotor;

calculating a position error as a difference between a position command applied to said servomotor and an actual position thereof after elapse of a predetermined period of time;

activating an alarm if the position error of said servomotor exceeds a predetermined value, or if the position error of another servomotor exceeds the predetermined value; and cutting off currents supplied to all the servomotors for thereby stopping movement of said industrial robot in response to the alarm.

2. A method of stopping an industrial robot after a collision of the industrial robot with foreign matter is detected, said method comprising the steps of:

after the collision is detected, informing a host processor of the collision;

setting a speed command for a servomotor for an axis with respect to which the collision is detected, to "0", to produce a reverse torque to stop rotation of said servomotor;

cutting off a current supplied to said servomotor after elapse of a predetermined period of time; and cutting off currents supplied to all the servomotors under control of said host processor in response to said informing of the collision, for thereby stopping movement of said industrial robot.

3. A robot control system for a robot having a plurality of axes drivable by servomotors corresponding thereto, comprising:

position deviation means for receiving a position command and a detected position for each of the servomotors and for generating a position deviation corresponding to each of the servomotors;

a read-only memory storing a control program for at least one axis;

collision detection means for detecting a collision condition along one of the axes;

speed command means, operating in accordance with the control program, for setting a speed command to zero for a servomotor corresponding to the one of the axes upon detection of the collision condition; and current supply means for cutting off current to all of the servomotors after a predetermined period of time has elapsed since setting of the speed command to zero if the position deviation for any of the servomotors exceeds a predetermined value.

4. A robot control system for a robot having a plurality of axes drivable by servomotors corresponding thereto, comprising:

a read only memory storing a control program;

a plurality of axis control circuits, each corresponding to one of the servomotors, to receive a position command, a speed command, an alarm signal and an actual position of the servomotor corresponding thereto, to generate a position error in dependence upon a difference between the position command and the actual position of the servomotor corresponding thereto and to control the servomotor in dependence upon the position error, the speed command and the alarm signal, including cutting off current supplied to the servomotor upon receipt of the alarm signal; and at least one digital signal processor, operatively connected to said axis control circuits and said read only memory, for executing the control program to set a speed command to zero for a servomotor producing movement along an axis when a collision condition is detected for movement along the axis and, after a predetermined period of time has elapsed since the speed command was set, to produce the alarm signal if the position error generated by any of said axis control circuits exceeds a predetermined value.

5. A robot control system as recited in claim 4, further comprising a host processor, operatively connected to said at least one digital processor to supply position commands controlling movement along the axes and current cut-off commands for servomotors of axes along which a collision has not been detected, and wherein said at least one digital signal processor informs the host processor upon detection of the collision condition, whereby the current supply is cut off for all of the servomotors for which no collision condition has been detected upon the detection of a collision condition on at least one of the servomotors and the current supply is cut off for the at least one of the servomotors only after the predetermined period of time has elapsed since the speed command for the at least one servomotor is set to zero.

* * * * *